United States Patent [19]

Heidemann

[11] Patent Number: 5,253,099
[45] Date of Patent: Oct. 12, 1993

[54] REFLECTIVE OPTICAL MODULATOR

[75] Inventor: Rolf Heidemann, Tamm, Fed. Rep. of Germany

[73] Assignee: Alcatel N.V., Amsterdam, Netherlands

[21] Appl. No.: 760,469

[22] Filed: Sep. 16, 1991

[30] Foreign Application Priority Data

Oct. 9, 1990 [DE] Fed. Rep. of Germany ....... 4031970

[51] Int. Cl.$^5$ .................. G02F 1/035; H01L 33/07
[52] U.S. Cl. ........................... 359/260; 372/6; 372/31; 385/1; 359/151; 359/285
[58] Field of Search ....................... 385/1-3; 359/151, 260, 169, 285-286, 579, 126, 188, 223, 317; 372/6, 31, 105

[56] References Cited

U.S. PATENT DOCUMENTS

| | | | |
|---|---|---|---|
| 3,863,064 | 1/1975 | Doyle et al. | 359/260 |
| 4,209,689 | 6/1980 | Linford et al. | 359/579 |
| 4,268,116 | 5/1981 | Schmadel et al. | 385/3 |
| 4,358,851 | 11/0982 | Scifres et al. | 372/6 |
| 4,446,543 | 5/1984 | McLandrich et al. | 367/149 |
| 4,533,829 | 8/1985 | Miceli et al. | 250/227 |
| 4,577,924 | 3/1986 | Mathis | 385/1 |
| 4,744,625 | 5/1988 | Lanzisera | 359/286 |
| 4,887,901 | 12/1989 | Falco et al. | 356/351 |
| 4,937,833 | 6/1990 | Kabacoff | 372/6 |
| 4,939,793 | 7/1990 | Stewart | 359/579 |

OTHER PUBLICATIONS

Electronics Letters, May 8th, 1986, vol. 22, No. 10, pp. 517 and 518.

Primary Examiner—Nelson Moskowitz
Attorney, Agent, or Firm—Spencer, Frank & Schneider

[57] ABSTRACT

In a reflective optical modulator light enters through an optical waveguide into a detunable optical resonator which couples it back into the optical waveguide, the modulation being effected by detuning the resonator. The resonator includes the end face of the optical waveguide through which the light enters and is coupled back, and a first reflective surface disposed opposite this face.

8 Claims, 2 Drawing Sheets $$x_0 = \frac{\lambda_0}{2}$$

REFLECTIVE OPTICAL MODULATOR

CROSS-REFERENCE TO RELATED APPLICATION

This application claims the priority of application Ser. No. P 40 31 970.9, filed Oct. 9, 1990 in the Federal Republic of Germany, the subject matter of which is incorporated herein by reference.

BACKGROUND OF THE INVENTION

1. Field of the Invention

The present invention relates to a reflective optical modulator.

2. Background Information

Such modulators are employed in optical data transmission systems in which a line end device generates the signal to be transmitted without having an available light source. The optical carrier for such a transmission signal in these systems is generated in a central station and is conducted to the line end device by way of an optical waveguide, is modulated there, and the resulting transmission signal is transmitted preferably over the same optical waveguide.

The publication entitled, Electronics Letters, May 8, 1986, Volume 22, No. 10, pages 517 and 518, discloses such a system which includes a reflective modulator. The disclosed reflective modulator is composed of an electro-optically active waveguide coupler which can be operated as a switch and is included in an integrated optical circuit.

The waveguide coupler has two branches each having two terminals. The optical waveguide for the transmission of data is disposed at a first terminal of the first branch and the reflective surface is disposed at a first terminal of the second branch. By way of suitable switching, light entering the modulator from the optical waveguide can be reflected back from the reflective surface into the optical waveguide. If one considers the light entering into the modulator as an optical carrier and the switching as modulation, it can be said that an optical transmission signal is generated by modulation of the carrier.

The drawback of the prior art reflective optical modulator is now that the adjustment between the optical waveguide and the integrated optical circuit in which the reflective modulator is disposed must be very accurate and is therefore correspondingly expensive from a technology aspect.

SUMMARY OF THE INVENTION

It is now an object of the invention to create a reflective optical waveguide in which the above drawback does not occur.

Further features of the invention are disclosed in the remainder of the specification.

A particular advantage of the invention is the use of the reflective modulator according to the invention in a transceiver module. It is advantageous that no coupler is required to divide the carrier power into a part for the photodiode and a part for the reflective surface and that, when operated as a transmitting module, no interfering reflections from the surface of the photodiode are mixed into the transmitted signal in the transceiver module.

Another advantage of the invention lies in that the required components are obtainable on the market as mass produced items.

BRIEF DESCRIPTION OF THE DRAWINGS

Five embodiments of the invention will now be described with reference to seven drawing figures. In which.

DETAILED DESCRIPTION OF THE PREFERRED EMBODIMENTS

Figure 1:
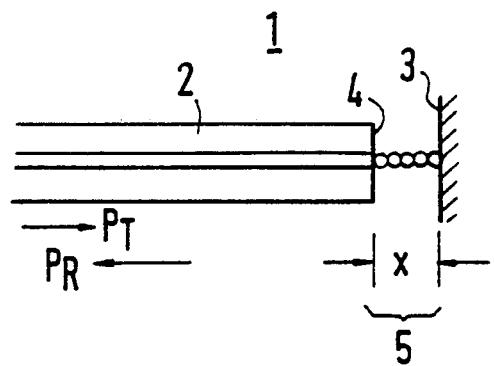
FIG. 1 illustrates the basic principle of the reflective optical modulator according to the invention.

FIG. 1 shows the basic principle of the reflective optical modulator according to the invention. For the sake of simplicity, the reflective optical modulator will hereinafter be simply called modulator. Modulator 1 includes the following components: one end face of an optical waveguide 2 through which light exits. This end face will hereinafter be called the second reflective surface 4. It lies opposite a first reflective surface 3. Reflective surfaces 3 and 4 lie parallel to one another and thus form a Fabry-Perot resonator 5 which has a resonator length x between the two reflective surfaces 3 and 4. The resonator length x is an optical length, i.e. the refractive index of a medium contained in the Fabry-Perot resonator 5 has been considered.

Figure 2:
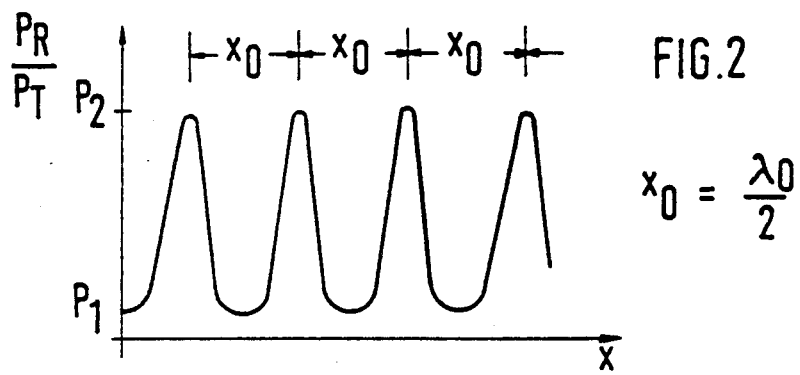
FIG. 2 is a graph of the relative level of the power reflected back into the fiber plotted over the resonator length x.

Light of a power level $P_T$ is coupled into the Fabry-Perot resonator 5 through the second reflective surface 4 and is at least partially reflected at the first reflective surface 3. Thus some of the light is coupled back into the optical waveguide 2 by way of the second reflective surface 4. This causes a standing wave to be formed in Fabry-Perot resonator 5. The typical course of the portion of the light at power level $P_R$ reflected into optical waveguide 2 with reference to the power level $P_T$ of the incident light is plotted in FIG. 2 over the resonator length x. It can be seen that the relative power level $P_R/P_T$ fluctuates periodically between a minimum power level $P_1$ which is less than $-40$ dB and a maximum power level $P_2$ around $-8$ dB. The period distance $x_0$ is equal to half a wavelength of the light which, for a wavelength of, e.g. $\lambda_0 = 1300$ nm, corresponds to a value of $x_0 = 650$ nm. By varying resonator length x it is thus possible to change the power level $P_R$ of the light component reflected back into optical waveguide 2 and thus it is possible to amplitude modulate the optical carrier. This variation will hereinafter be called the modulation deviation.

The variation in resonator length x here constitutes only a special type of detuning of Fabry-Perot resonator 5. Resonator 5 may also be detuned by tilting one of the two reflective surfaces 3, 4 out of its plane or by deforming one of the two reflective surfaces 3, 4, or in some other way or by a combination of the above mentioned possibilities. The realization of a modulator by utilizing some of the mentioned detuning possibilities will be demonstrated below in the embodiments.

In order to reduce divergence losses in the light energy when the light exits from optical waveguide 2, resonator 5 may include an optical imaging system in the beam path between the two reflective surfaces 3 and 4.

Due to the divergence of the light exiting from the optical waveguide 2, it is not absolutely necessary to employ a Fabry-Perot resonator 5 having two parallel reflective surfaces 3 and 4 as the resonator. If the normals to the two reflective surfaces 3 and 4 form an angle other than zero degrees, the first reflective surface 3 reflects diffracted exiting light from optical waveguide 2 back into optical waveguide 2. If the angle formed by the normals to the two reflective surfaces 3 and 4 is selected to be other than zero in the quiescent position, it is recommended to that the degree of reflection of the first reflective surface 3 be selected to decrease with increasing angle.

Advantageously a glass fiber lightguide is employed as optical waveguide 2. The second reflective surface 4 is then an end face of the glass fiber lightguide and is preferably disposed at a right angle to the glass fiber sheath.

The quality of resonator 5 can be adjusted by changing the degree of reflection of reflective surfaces 3, 4 is in a known manner, for example, by applying selected layers.

Figure 3:
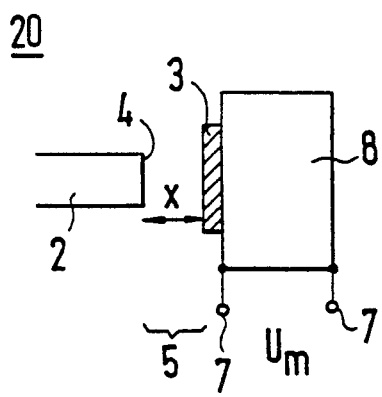
FIG. 3 shows a first embodiment of a reflective optical modulator according to the invention including a compression-type resonator as the vibratory element.

FIG. 3 shows a first embodiment of the invention in the form of modulator 20. In addition to the above-described features shown in FIG. 1, modulator 20 includes, as a mechanical vibrator device, a compression-type resonator 8 in the form of a piezoelectric transducer having electrical terminals 7 to which can be applied a modulation voltage $U_m$, that is, the modulation signal. The first reflective surface 3 is connected with piezoelectric transducer 8 in such a way that the resonator length x is changed by the application of modulation voltage $U_m$.

Figure 4:
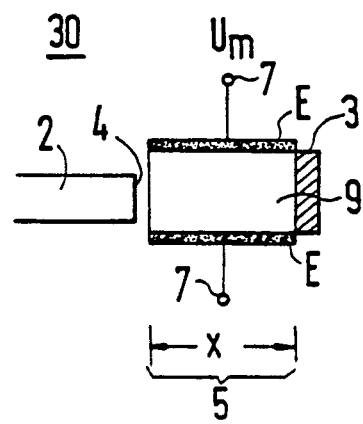
FIG. 4 shows a second embodiment of a reflective optical modulator according to the invention including an electro-optically active medium to vary the resonator length x.

FIG. 4 shows a second embodiment of the invention in the form of modulator 30 in which detuning is also effected by varying the resonator length x. For this purpose, a birefringent medium 9 is disposed between two electrodes E to which the modulation voltage $U_m$ is applied. The refractive index of medium 9 can be varied by the application of modulation voltage $U_m$. A change in the refractive index of medium 9 changes the resonator length x. The effective first reflective surface 3 lies on a surface of medium 9 that lies at a right angle to the faces against which electrodes E lie. The second reflective surface 4 is located on the side of medium 9 opposite the first reflective surface 3.

Figure 5:
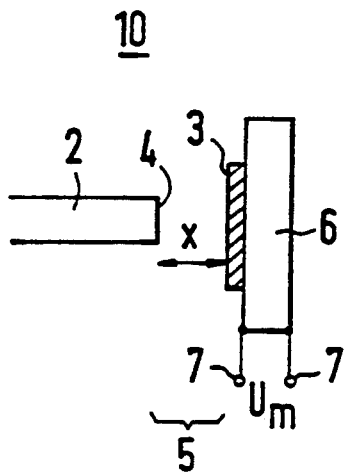
FIG. 5 shows a third embodiment of a reflective optical modulator according to the invention including a flexural resonator as the vibratory element.

The third embodiment in the form of a modulator 10 is shown in FIG. 5. Compared to modulator 20 of FIG. 3, the compression-type resonator 8 of this modulator 10 has been replaced by a flexural resonator 6, preferably a quartz oscillator. The Fabry-Perot resonator 5 of this modulator 10 is detuned by a combination of varying the resonator length x and tilting the first reflective surface 3 out of its quiescent plane.

Figure 6:
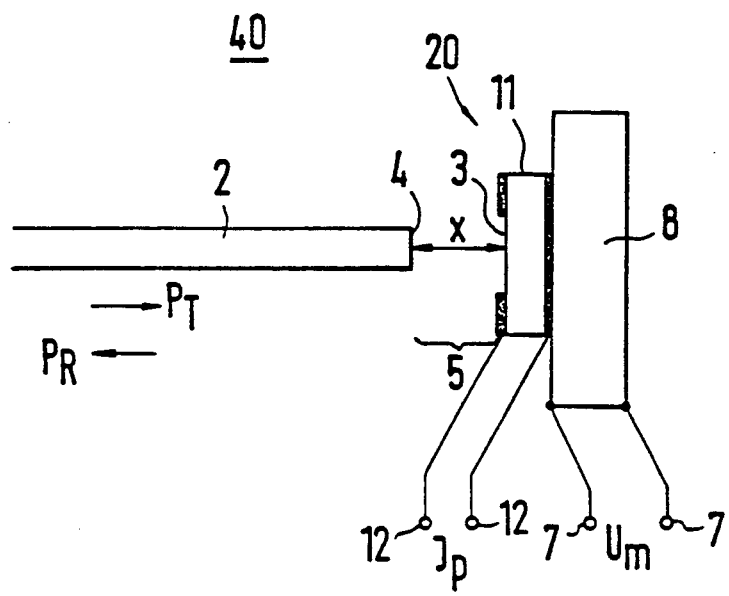
FIG. 6 shows an embodiment of a transceiver module according to the invention.

FIG. 6 shows a transceiver module 40 which is equipped with a modulator according to the invention, here modulator 20 of the second embodiment. In order to receive data signals, a photodiode 11, for example a PIN photodiode, is disposed on compression-type resonator 8. The first reflective surface 3 here constitutes the entrance surface for the light into photodiode 11. The generated photocurrent $I_p$ flows through terminals 12.

Photodiode 11 detects the light that enters at power $P_T$ minus the reflected component. Since the generated photocurrent $I_p$ is only slightly dependent upon the resonator length x, there is no interfering modulation of photocurrent $I_p$ due to the variation of resonator length x. A typical value for the interference lies below 1 dB.

A particular advantage of the modulator 10, 20, 30 according to the present invention compared to the prior art modulator is the uncomplicated coupling between optical waveguide 2 and Fabry-Perot resonator 5. Modulators 10, 20, 30 require merely a coupling of the quality of an average waveguide-photodiode coupling, whereas the prior art modulator, due to its "integrated optical waveguides", requires a coupling of the higher quality of a waveguide-laser coupling.

In an alternate embodiment not shown, a flexural resonator is used instead of a compression-type in the transceiver module reducing the coupling problem compared to the prior art transceiver module at least in the adjustment direction which lies in the direction of movement of the flexural resonator.

Figure 7:
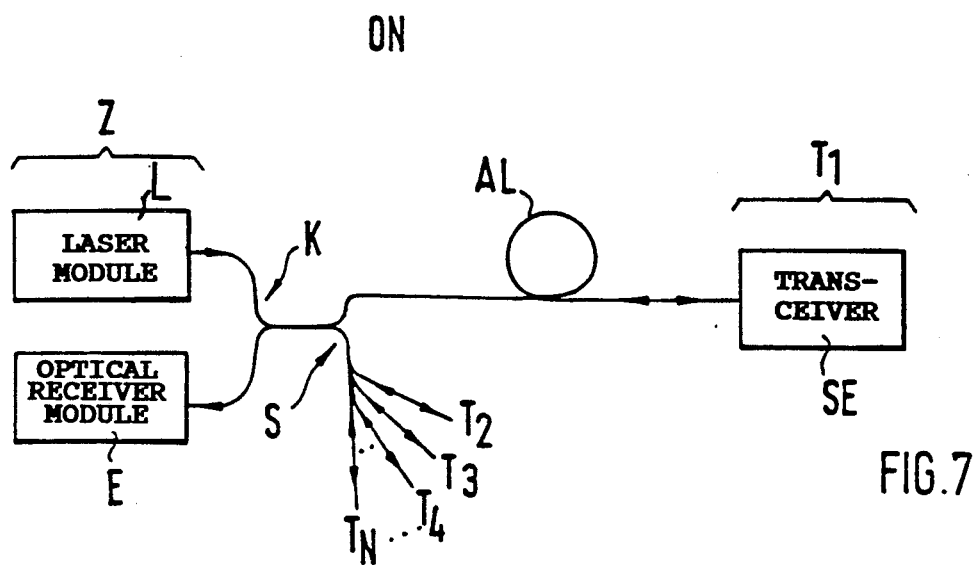
FIG. 7 shows an embodiment of an optical transmission system according to the invention.

The complete operation of the transceiver module will now be described in connection with the embodiment of an optical data transmission system ON as shown in FIG. 7. The data transmission system ON includes a central station Z and several subscribers $T_i$, where i=1, 2, ..., N. As an example, only the transmission from central station Z to subscriber $T_1$ and back will be described here. Central station Z includes laser module L which generates a carrier of a wavelength $\lambda_0 = 1300$ nm modulated with a frequency $f_0 = 5$ MHz. This modulated carrier is transmitted by way of star distributor S and optical waveguide AL to transceiver module SE at subscriber end $T_1$ and is received there. In transceiver module SE, the light is modulated by the reflective optical modulator with a modulation frequency $f_1 = 600$ kHz. Care must be taken that the modulation bands, including the sidebands and the harmonics, are not superposed on one another. The reflected signal modulated with frequency $f_1$ is now transmitted over the same optical waveguide AL and star distributor S to central station Z and is there fed by way of 3 dB power coupler K to optical receiver module E. The optical receiver module E is followed by an electrical receiver which filters out the desired band, for example at the modulation frequency $f_1$, and demodulates it.

If the modulation in transceiver module SE is effected by means of a vibration of the first reflective surface 3 over several oscillation nodes of the standing wave in Fabry-Perot resonator 5, non-linearities also produce interfering modulations in each case at a band spacing of modulation frequency $f_1 = 600$ kHz. These interfering modulations can be filtered out electrically in receiving module E in the above described manner.

In order to transmit from transceiver module SE of carrier 1 $E_1$ to central station Z in the baseband, it is necessary to limit the modulation deviation in the reflective optical modulator to a value of about $\lambda_0/4$. The operating point preferably is removed from one of the oscillation antinodes of the standing wave by $\lambda_0/8$.

The transmission from central station Z to the subscribers and in the opposite direction is effected by way of signals that are coded with an NRZ (non-return to zero) code. These signals may be amplitude, phase or frequency modulated.

The optical data transmission system ON makes it possible to supply several subscribers $T_i$ by means of a single laser module S disposed in central station Z and by way of star distributor S. The subscribers, in turn, are able to transmit signals directed to central station Z by modulating the received carrier. The identification of the individual subscriber signals in central station Z is made by the use of different frequency f1 for the subcarrier.

In this embodiment, the transmission in the downward direction is broadbanded, for example, for cable television and telephone; the transmission in the upward direction is narrowbanded, for example, only for telephone. However, particularly if a modulator 30 according to the second embodiment is employed, a symmetrical broadband transmission is also possible.

It will be understood that the above description of the present invention is susceptible to various modifications, changes and adaptations, and the same are intended to be comprehended within the meaning and range of equivalents of the appended claims.

What is claimed is:

1. A reflective modulator including:
   an optical waveguide;
   a reflecting surface arranged opposite an end face of the optical waveguide; and
   modulation means for modulating, with a modulation signal, light exiting from the end face of the optical waveguide and coupled back into the optical waveguide by the reflecting surface;
   wherein the modulation means comprises a detunable optical resonator having first and second reflective surfaces disposed opposite one another, the first reflective surface of the resonator being said reflecting surface and the second reflective surface of the resonator being the end face of the optical waveguide;
   wherein the modulation signal controls detuning of the optical resonator to thereby effect modulation of the light; and
   wherein at least one of the first and second reflective surfaces is tiltable with respect to the other reflective surface under control of the modulation signal.

2. A reflective modulator according to claim 1, wherein, in order to detune the resonator, the first reflective surface is disposed on a mechanical vibrator which is actuated by the modulation signal.

3. An optical transceiver module including a reflective modulator according to claim 1, wherein light passing through the first reflective surface can be detected as a received signal in a photodiode disposed behind the first reflective surface.

4. A reflective modulator according to claim 1, wherein the optical length of the resonator is variable in a controlled manner by the modulation signal.

5. An optical transceiver module including a reflective modulator comprising:
   an optical waveguide;
   a reflecting surface arranged opposite an end face of the optical waveguide; and
   modulation means for modulating, with a modulation signal, light exiting from the end face of the optical waveguide and coupled back into the optical waveguide by the reflecting surface;
   wherein the modulation means comprises a detunable optical resonator having first and second reflective surfaces disposed opposite one another, the first reflective surface of the resonator being said reflecting surface and the second reflective surface of the resonator being the end face of the optical waveguide;
   wherein the modulation signal controls detuning of the optical resonator to thereby effect modulation of the light;
   wherein light passing through the first reflective surface can be detected as a received signal in a photodiode disposed behind the first reflective surface; and
   wherein the first reflective surface is a surface of the photodiode through which light enters the photodiode to be detected.

6. A reflective modulator according to claim 5, wherein, in the quiescent state, normals to the first and second reflective surfaces are parallel, the resonator thereby forming a Fabry-Perot resonator.

7. A reflective modulator according to claim 5, wherein normals to the first and second reflective surfaces are not parallel in the quiescent state.

8. A reflective modulator according to claim 4, characterized in that a birefringent medium having a variable refractive index is disposed between the reflective surfaces in order to vary the optical length.

* * * * *